United States Patent [19]

Schmidt et al.

[11] Patent Number: 5,024,800
[45] Date of Patent: Jun. 18, 1991

[54] TIRE-MAKING METHOD

[75] Inventors: Oskar Schmidt; Erich Grünner, both of Wien, Austria

[73] Assignee: Lim Kunststoff Technologic Gesellschaft M.B.H., Kittsee, Austria

[21] Appl. No.: 465,737

[22] Filed: Jan. 16, 1990

[30] Foreign Application Priority Data

Jan. 18, 1989 [AT] Austria .................................. 89/89

[51] Int. Cl.⁵ ...................... B29C 45/14; B29D 30/18
[52] U.S. Cl. ........................... 264/502; 152/DIG. 16; 156/125; 156/128.1; 264/326; 264/328.3; 264/513; 425/44
[58] Field of Search ............... 264/501, 315, 326, 258, 264/328.3, 502, 513; 425/35, 36, 43, 44; 152/DIG. 16; 156/125, 128.1

[56] References Cited

U.S. PATENT DOCUMENTS

| | | |
|---|---|---|
| 2,645,265 | 7/1953 | O'Neil ........................ 152/DIG. 16 |
| 3,229,013 | 1/1966 | Newton et al. ..................... 264/326 |
| 3,554,262 | 1/1971 | Swanson ............................. 425/44 |
| 3,782,871 | 1/1974 | Turk ................................. 425/35 |
| 4,065,338 | 12/1977 | Mirtain .............................. 264/326 |
| 4,295,513 | 10/1981 | Lovell et al. ....................... 264/501 |
| 4,444,612 | 4/1984 | Fink ................................. 425/43 |
| 4,502,520 | 3/1985 | Sandstrom ................... 152/DIG. 16 |

FOREIGN PATENT DOCUMENTS 383541 12/1986 Austria .
60-141539 7/1985 Japan ..................................... 425/35

Primary Examiner—Jan H. Silbaugh
Assistant Examiner—Mathieu Vargot
Attorney, Agent, or Firm—Herbert Dubno; Andrew Wilford

[57] ABSTRACT

A tire is made by first fitting a pair of bead rings interconnected by reinforcement over a gas-pervious annular liner to form an annular core assembly and then inflating the core assembly by directly contacting same with a fluid to impart to the core assembly an inwardly open U-shaped section. This U-section core assembly is then spacedly enclosed in a mold which is filled around the U-section core assembly with a hardenable elastomer which is hardened so it bonds to the reinforcement, rings, and liner to form a tire. Finally the liner is deflated and the tire is demolded. The liner has a pair of opposite end edges and is inflated by sequentially clamping each of the edges against a support so as to define between the liner and the support a pressurizable chamber, displacing one of the clamped edges toward the other so as to outwardly bow the liner, and introducing a fluid, typically air, into the chamber. It is also possible to mount the rings in the mold and thereafter introduce the liner into the form for fitting it and the rings together.

10 Claims, 3 Drawing Sheets

TIRE-MAKING METHOD

FIELD OF THE INVENTION

The present invention relates to a method of making a load-supporting body. More particularly this invention concerns the manufacture of a tire.

BACKGROUND OF THE INVENTION

A standard tire comprises a pair of annular bead wires interconnected by an annular U-section reinforcement, a liner inside this structure, and an elastomeric tread-forming body outside it. The liner is gas tight for standard tubeless use of the tire, and the tread-forming body is vulcanized through the reinforcement with this liner so the entire assembly is essentially one piece.

Such a tire is made according to Austrian patent 383,541 from a prefabricated outer part comprising the tread, belting underlying the tread, and the outer regions of the tire side walls and a prefabricated inner part comprising the liner, bead wires, and radial windings. This inner part is fitted over a cylindrical bladder which is then expanded to push it into the U-section outer part, and then the two parts are bonded together. Subsequently the bladder is relaxed and withdrawn.

This method is some improvement on the prior-art systems using a solid mold core, but still has substantial room for improvement. The prefabrication of the inner and outer parts is a substantial amount of work. In addition the bladder frequently blows up asymmetrically so that the resultant tire is similarly asymmetrical and must be rejected. Furthermore the bladder is subjected to considerable wear and must be replaced often.

In Austrian patent 379,346 a radially reinforced tire inner part is drawn over an inflatable bladder and the core of a prefabricated belt is drawn over it. Then this assembly is covered with the liquid elastomer which hardens to form the onepiece tire. Once again the inflatable bladder is a much abused element that must be replaced often, with the concomitant down time for the machinery and plant.

OBJECTS OF THE INVENTION

It is therefore an object of the present invention to provide an improved method of making a tire.

Another object is the provision of such an improved method of making a tire which overcomes the above-given disadvantages, that is which allows a tire or other load-carrying object like a tire to be made without the use of preprepared parts and without the use of a failure-prone bladder.

SUMMARY OF THE INVENTION

The method according to this invention of making a tire comprises the steps of first fitting a pair of bead rings interconnected by reinforcement over a gas impervious annular liner to form an annular core assembly and then inflating the core assembly by directly contacting same with a fluid to impart to the core assembly an inwardly open U-shaped section. This U-section core assembly is then spacedly enclosed in a mold which is filled around the U-section core assembly with a hardenable elastomer which is hardened so it bonds to the reinforcement, rings, and liner to form a tire. Finally the liner is deflated and the tire is demolded.

With this system, therefore, the liner itself is inflated to form the inner tire part, eliminating the use of a separate element. Since this liner is only inflated once there is no problem of it wearing out, and since it is inherently gas-impervious it is easily inflatable.

For manufacture of a standard vehicular tire the rings are of substantially the same size and the liner is generally cylindrical before inflation. For other purposes it is possible to use rings of different sizes so the liner is of generally frustoconical shape before inflation.

The method of this invention further includes the step of fitting a reinforcement belt around the inner assembly before it is enclosed in the mold. In this case the belt is fitted over the inner assembly after same is inflated. Similarly a tread ring can be fitted around the inner assembly before it is enclosed in the mold, once again normally after same is inflated with a gas or liquid.

According to further features of this invention the liner has a pair of opposite end edges and is inflated by sequentially clamping each of the edges against a support so as to define between the liner and the support a pressurizable chamber, displacing one of the clamped edges toward the other so as to outwardly bow the liner, and introducing a fluid, typically air, into the chamber. It is also possible to mount the rings in the mold and thereafter introduce the liner into the mold for fitting it and the rings together.

The reinforcement according to this invention can be wound in a single or in multiple layers over the rings. In the latter case a cord web is provided web within the reinforcement.

DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
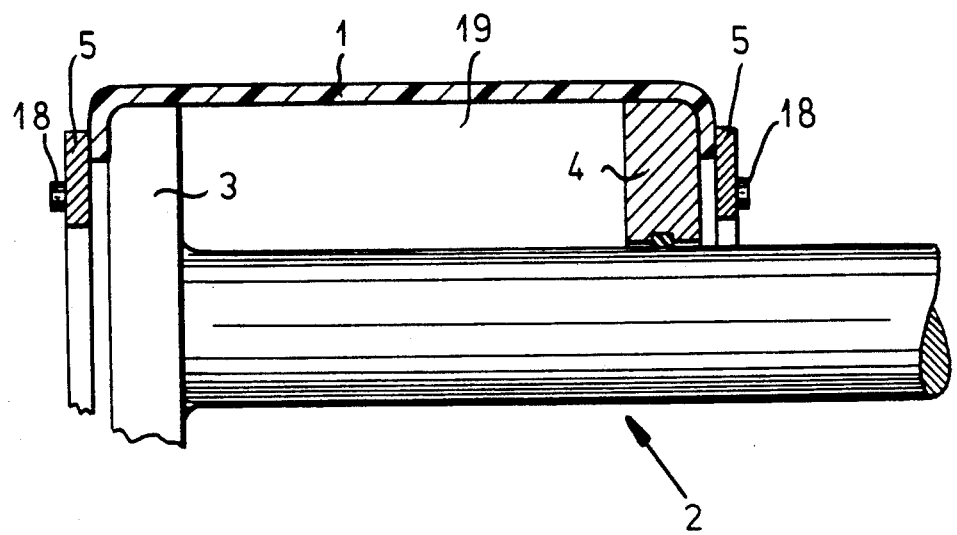
FIGS. 1 and 2 are axial sections showing the assembly of the inner tire assembly and its preparation for inflation.

As seen in FIG. 1 a liner sleeve 1 which is basically a short cylindrical tube formed of an elastomer-impregnated textile is fitted over a holder 2 having a fixed disk 3 at its end and an annular disk 4 slidable toward and away from this disk 3. Clamp rings 5 are secured by bolts 18 or the like to the axially oppositely directed faces of the disks 3 and 4 to clamp the end edges of the liner 1 in place and form an annular and substantially closed chamber 19 inside it.

Figure 2:
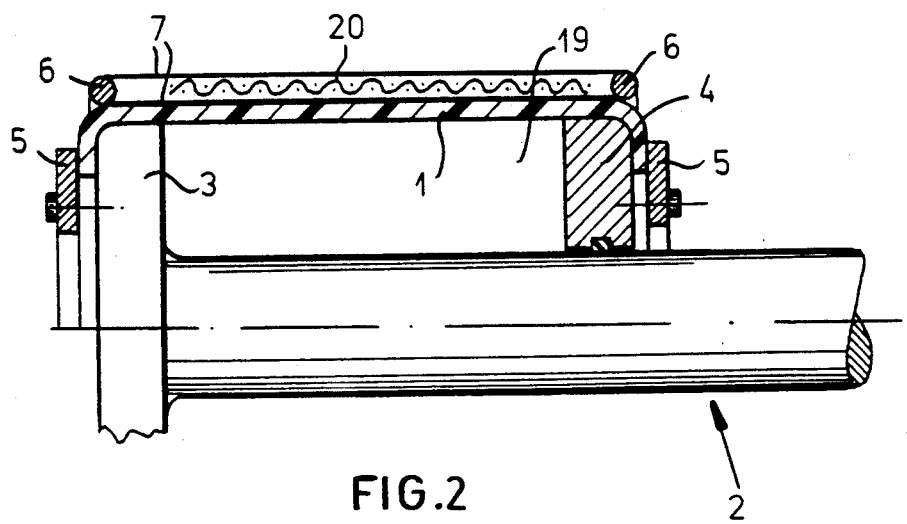

Then as seen in FIG. 2 a pair of rings 6 each formed by a steel cable are engaged over the clamped liner 1. The rings 6 are interconnected by a wound reinforcement 7 that may confine a reinforcement belt 20.

Figure 3A:
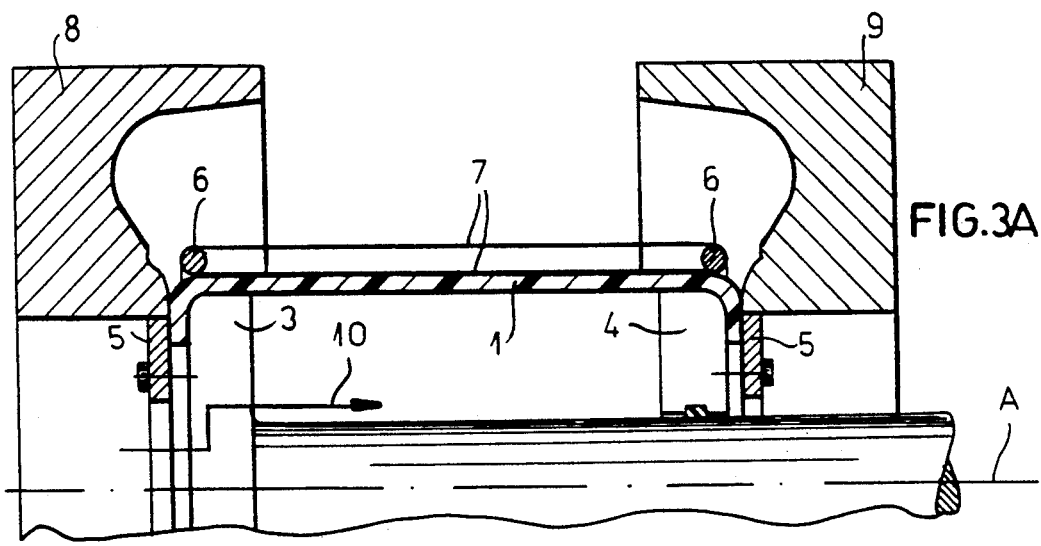
FIGS. 3A and 3B are axial sections showing how the inner assembly is fitted to a mold and then inflated for casting of the tire.
Figure 3B:
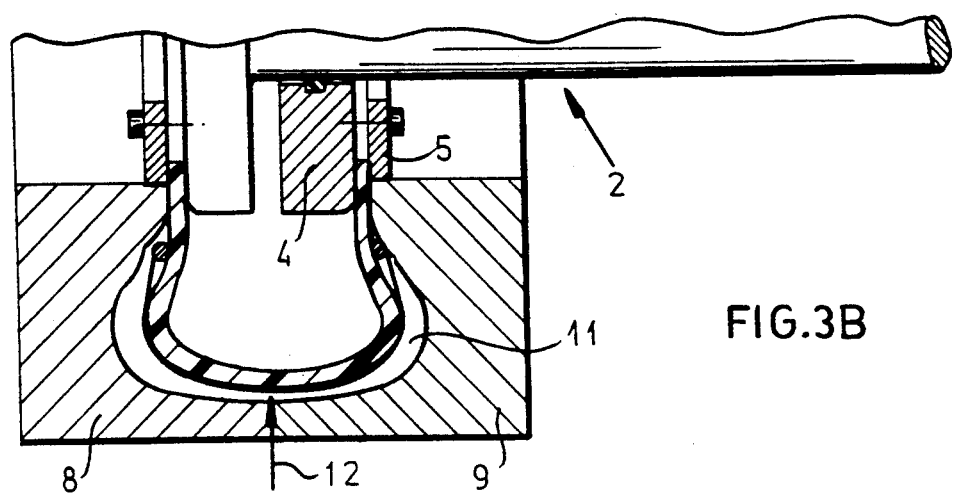

Subsequently (FIG. 3A) a pair of mold halves 8 and 9 are fitted to opposite ends of this liner assembly 1, 6, 7, and generally simultaneously (FIG. 3B) the mold halves 8 and 9 are moved together along the axis A and a fluid, here air, is injected into the chamber 19 as indicated at arrow 10. This bows out the liner assembly 1, 6, 7 to give it an inwardly U-shaped section. When thus inflated it defines with the mold 8, 9 an inwardly U-section chamber 11 that itself is filled with a hardenable elastomer as indicated at 12. This elastomer bonds to the reinforcement 7, wires 6, and liner 7 and forms an essentially integral construction that is subsequently demolded and trimmed for use as a vehicular tire.

Figure 7:
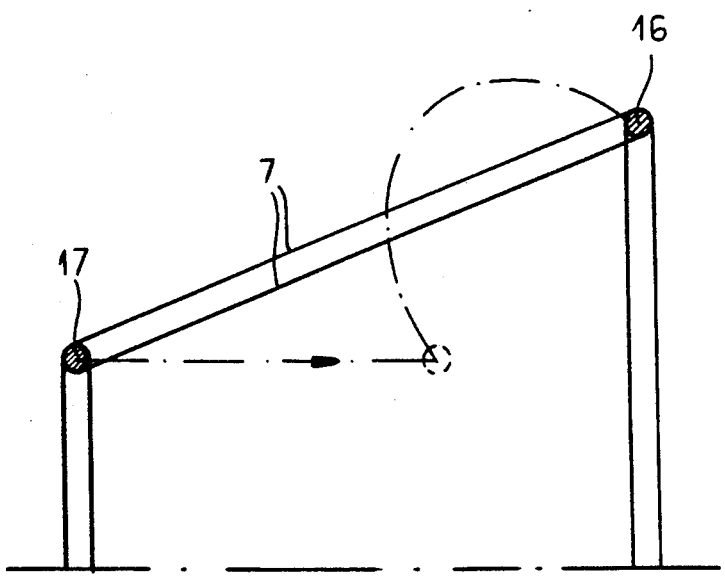
FIG. 7 is a section through another inner assembly according to the invention.
Figure 4:
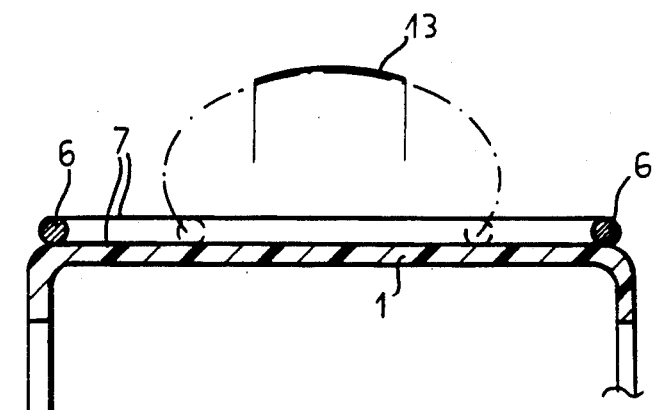
FIGS. 4 and 5 are views like FIG. 1 showing two variations of the method of this invention.
Figure 5:
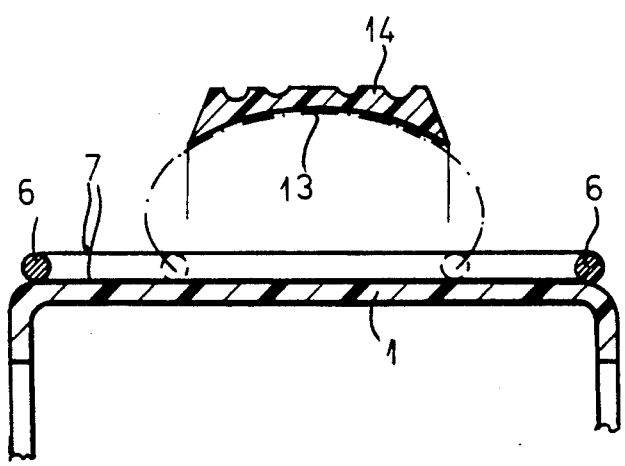
Figure 6:
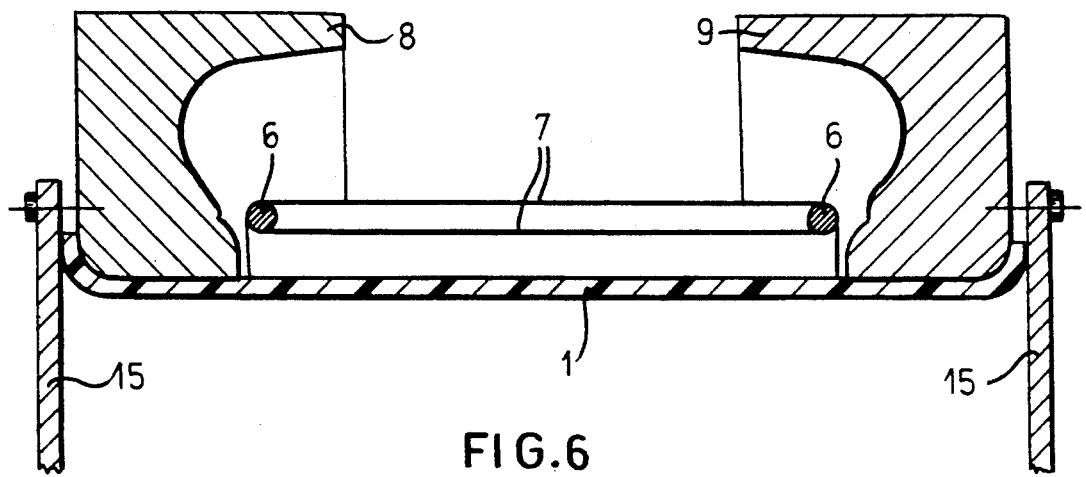
FIG. 6 is a view like FIG. 3A showing another variation on the inventive method.

FIG. 4 indicates how after the liner 1 is inflated it can be provided with an external reinforcement belt 13, and FIG. 5 shows how a prefabricated tread 14 can similarly be mounted on it. FIG. 6 illustrates how the wires 6 and reinforcement 7 can be mounted in the mold 8, 9 before the liner 1 is clamped by rings 15 to its opposite end faces, in which case the mold 8, 9 replaces the holder 2 and its disks 3 and 4. Finally FIG. 7 illustrates how rings 16 and 17 of different diameters can be used, in which case the reinforcement and liner are of frusto-conical shape.

What is claimed is:

1. A method of making a tire comprising the steps of sequentially:
   providing a gas-impervious annular liner having a pair of end edges;
   clamping each of the edges against a support so as to define between the liner and the support a pressurizable chamber;
   fitting a pair of bead rings interconnected by reinforcement over the gas-impervious annular liner to form an annular core assembly having a pair of end edges;
   displacing one of the clamped edges toward the other so as to outward bow the liner;
   inflating the core assembly through direct contact by introducing gas into the chamber to impart to the core assembly an inwardly open U-shaped section;
   spacedly enclosing the U-section core assembly in a mold;
   filling the mold around the U-section core assembly with a hardenable elastomer and hardening the elastomer such that the elastomer bonds to the reinforcement, rings, and liner to form a tire; and
   deflating and demolding the tire.

2. The tire-making method defined in claim 1 wherein the rings are of substantially the same size and the liner is generally cylindrical before inflation.

3. The tire-making method defined in claim 1 wherein the rings are of different sizes and the liner is of generally frustoconical shape before inflation.

4. The tire-making method defined in claim 1, further comprising the step of
   fitting a reinforcement belt around the core assembly before it is enclosed in the mold.

5. The tire-making method defined in claim 4 wherein the belt is fitted over the core assembly after same is inflated.

6. The tire-making method defined in claim 1, further comprising the step of
   fitting a tread ring around the core assembly before it is enclosed in the mold.

7. The tire-making method defined in claim 6 wherein the tread ring is fitted over the core assembly after same is defined.

8. The tire-making method defined in claim 1 wherein the rings are mounted in the mold and thereafter the liner is introduced into the mold for fitting it and the rings together.

9. The tire-making method defined in claim 1 wherein the reinforcement is wound in multiple layers over the rings.

10. The tire-making method defined in claim 9, further comprising the step of
    providing a core web within the reinforcement.

* * * * *